(12) United States Patent
Belling et al.

(10) Patent No.: US 9,787,850 B2
(45) Date of Patent: Oct. 10, 2017

(54) METHOD FOR ALLOWING CONTROL OF THE QUALITY OF SERVICE AND/OR OF THE SERVICE FEES FOR TELECOMMUNICATION SERVICES

(75) Inventors: Thomas Belling, Erding (DE); Mirko Schramm, Berlin (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1022 days.

(21) Appl. No.: 12/299,696

(22) PCT Filed: Apr. 25, 2007

(86) PCT No.: PCT/EP2007/054032
§ 371 (c)(1),
(2), (4) Date: Dec. 23, 2008

(87) PCT Pub. No.: WO2007/128693
PCT Pub. Date: Nov. 15, 2007

(65) Prior Publication Data
US 2009/0190506 A1     Jul. 30, 2009

(30) Foreign Application Priority Data
May 5, 2006   (DE) .................. 10 2006 022 046

(51) Int. Cl.
*H04L 12/16*     (2006.01)
*H04M 15/00*     (2006.01)
(Continued)

(52) U.S. Cl.
CPC ............ *H04M 15/00* (2013.01); *H04L 12/14* (2013.01); *H04L 12/145* (2013.01); *H04L 65/80* (2013.01);
(Continued)

(58) Field of Classification Search
CPC ..... H04L 67/16; H04L 12/5692; H04L 12/14; H04L 12/145; H04L 65/1016;
(Continued)

(56) References Cited

U.S. PATENT DOCUMENTS

| 6,854,117 B1 * | 2/2005 | Roberts .................. 709/238 |
| 2003/0037133 A1 * | 2/2003 | Owens .................. 709/223 |

(Continued)

FOREIGN PATENT DOCUMENTS

| EP | 1708433 A2 | 10/2006 |
| WO | 03026318 A2 | 3/2003 |

(Continued)

OTHER PUBLICATIONS

Ericsson, Operator Controlled QoS; XP007901697 Bd. SA2# 50, Nr. S2-60049 p. 5pp.

(Continued)

*Primary Examiner* — Thai Vu
(74) *Attorney, Agent, or Firm* — Laurence A. Greenberg; Werner H. Stemer; Ralph E. Locher (57) ABSTRACT

A method permitting the control of the service quality and/or service fees of telecommunication services in which several service nodes are involved. During the initiation and/or implementation of a communication service, an exchange of signaling data occurs between a communications terminal and at least two service nodes which are involved in the communication service. The control node detects whether the service data transmitted by the at least two service nodes relate to the very same communication service. Then the control node selects service data from the transmitted service data and uses these service data for controlling the service quality and/or service fees.

42 Claims, 2 Drawing Sheets (51) Int. Cl.
*H04L 12/14* (2006.01)
*H04L 29/06* (2006.01)

(52) U.S. Cl.
CPC ....... *H04M 15/57* (2013.01); *H04M 15/8016* (2013.01); *H04M 15/8038* (2013.01); *H04L 65/1016* (2013.01); *H04L 65/1069* (2013.01); *H04M 2215/204* (2013.01); *H04M 2215/208* (2013.01); *H04M 2215/34* (2013.01); *H04M 2215/7414* (2013.01); *H04M 2215/7442* (2013.01)

(58) Field of Classification Search
CPC .... H04L 65/1069; H04L 65/80; H04W 48/18; H04M 15/00; H04M 15/57; H04M 15/8016; H04M 15/8038; H04M 2215/204; H04M 2215/208; H04M 2215/34; H04M 2215/7414; H04M 2215/7442
USPC ........... 455/405, 406, 414.1, 452.2; 709/219, 709/227, 228, 249
See application file for complete search history.

(56) References Cited

U.S. PATENT DOCUMENTS

| | | | |
|---|---|---|---|
| 2004/0236633 A1* | 11/2004 | Knauerhase et al. | 705/26 |
| 2004/0236686 A1 | 11/2004 | Bohmer et al. | |
| 2005/0021761 A1* | 1/2005 | Thomas | 709/227 |
| 2005/0149294 A1* | 7/2005 | Gebhart | 702/186 |
| 2006/0166668 A1* | 7/2006 | Choi et al. | 455/435.2 |

FOREIGN PATENT DOCUMENTS

| | | |
|---|---|---|
| WO | 2004100466 A1 | 11/2004 |
| WO | WO 2005004518 A1 * | 1/2005 |

OTHER PUBLICATIONS

3GPP 3rd Generation Partnership Project, Technical Specification Group Services and System Aspects, Policy and charging control architecture, (Release 7) XP014033549 Bd. 3-SA2, Nr. V040 Chapter 5.1, 5.2.2, 6.1.5, 6.2.1, 6.3.

* cited by examiner

METHOD FOR ALLOWING CONTROL OF THE QUALITY OF SERVICE AND/OR OF THE SERVICE FEES FOR TELECOMMUNICATION SERVICES

BACKGROUND OF THE INVENTION

Field of the Invention

The invention relates to a method for allowing control of the quality of service and/or of the service fees for telecommunication services in which a plurality of service nodes are involved.

Telecommunication services are frequently provided beyond the boundaries of a plurality of telecommunication networks or telecommunication network parts which are connected to one another. Telecommunication networks or network parts such as these are normally connected to one another by means of gateways. These gateways allow the transmission of payload data occurring in the telecommunication networks from one telecommunication network to the adjacent telecommunication network. The gateways assign, for example, the required or guaranteed data transmission bandwidths to the payload data streams, and/or allow charging for the transmission of the payload data.

Gateways such as these are controlled via monitoring nodes (control nodes) which, for example, carry out and/or have one of the following functions: a so-called "policy decision function" (which allows the control of the quality of service), a so-called "service policy decision function" (which allows the control of the quality of service), a "charging rules function" (which allows the control of the service fees) or a "policy control and charging rules function" (which allows the control of the quality of service and of the service fees). For the purposes of this application, the control of the quality of a transport connection (bearer) or the setting up of a transport connection with a specific quality is also referred to as "control of the quality of service".

In order to control the quality of service and/or the service fees, the monitoring node requires service information, that is to say information about the telecommunication service which is currently being prepared for or carried out in the telecommunication network and whose payload data streams are transmitted via the gateway. Service information such as this comprises, for example, the IP addresses and the port numbers of the appliances involved in a telecommunication service (that is to say for example IP addresses and port numbers of a communication terminal and of a service server), information about the nature of the telecommunication service and the quality of service which is required for this telecommunication service (for example the required bandwidth for data transmission and the maximum permissible delay times). Service information such as this is provided by service nodes which are involved in the telecommunication service. Service nodes such as these may, for example, be a communication network node which provides a "call session control function" or else the service server which provides the communication service.

Particularly in the case of telecommunication services which cover more than one network (for example in the case of so-called roaming), a plurality of service nodes may be involved which each transmit service information to one and the same monitoring node. In this case, a situation can occur in which the various service nodes transmit different service information to the monitoring node. It is then not possible for the monitoring node to find out which service information is correct and which service information is incorrect. Even if the various service nodes transmit identical service information to the monitoring node, inadvertent malfunctions can occur in the monitoring node. By way of example, this may be the case if the monitoring node incorrectly assumes that the service information of the various service nodes in each case belongs to different communication services. For example, if two service information items originating from different service nodes, each containing information about a required data transmission bandwidth of 100 kbit/s, were to arrive, a monitoring node could provide a bandwidth of twice 100 kbit/s, that is to say a total of 200 kbit/s.

BRIEF SUMMARY OF THE INVENTION

The invention is based on the object of specifying a method which allows safe and reliable control of the quality of service and/or of the service fees for telecommunication services in which a plurality of service nodes are involved.

According to the invention, this object is achieved by a method for allowing control of the quality of service and/or of the service fees (for example at a gateway) for telecommunication services in which a plurality of service nodes are involved, wherein when preparing for and/or carrying out a communication service, an interchange of signaling information takes place between a communication terminal and at least two service nodes which are involved with the communication service, the service nodes are designed to transmit service information, which is relevant to this communication service, to a monitoring node, and the monitoring node is designed to receive from the at least two service nodes the service information which relates to this communication service, wherein, in the method, the monitoring node determines (on the basis of the service information transmitted by the service nodes) whether the service information which is transmitted by the at least two service nodes relates to one and the same communication service, and if the service information relates to one and the same communication service, the monitoring node selects service information from the transmitted service information, and uses this (selected) service information to control the quality of service and/or the service fees. In this case only the (selected) service information is advantageously used by the monitoring node in order to control the quality of service and/or the service fees. This precludes malfunctions resulting from service information existing more than once as well as accidental control of a quality of service which could otherwise be higher than required, for example by determination of a multiple of the required bandwidth, and/or reliably avoids multiple service charging.

The invention also provides for the method to be configured as follows: A method for allowing control of the quality of service and/or of the service fees (for example at a gateway) for telecommunication services in which a plurality of service nodes are involved, wherein when preparing for and/or carrying out a communication service, an interchange of signaling information takes place between a communication terminal and at least two service nodes which are involved with the communication service, the service nodes are designed to transmit service information, which is relevant to this communication service, to a monitoring node, and the monitoring node is designed to receive from the at least two service nodes the service information which relates to this communication service, wherein, in the method, the monitoring node determines (on the basis of the service information transmitted by the service nodes)

whether the service information which is transmitted by the at least two service nodes relates to one and the same communication service, and if this service information relates to one and the same communication service, one service node is selected, and only that service information which originates from the selected service node is used to control the quality of service and/or the service fees. In this case, only that service information which originates from the one selected service node is advantageously used by the monitoring node in order to control the quality of service and/or the service fees. In this case, different service nodes may be selected at different times. The advantages mentioned above also apply to this method.

The method can be carried out in such a way that the monitoring node determines whether the service information relates to one and the same communication service in that the monitoring node checks whether the service information which is transmitted by the at least two service nodes contains matching charging identifications. In this case, it is particularly advantageous that charging identifications—that is to say connection-specific parameters—are used which uniquely describe and/or identify the communication service. Charging identifications can advantageously be used in this case, which are already in use for example for association of different charging data with a communication service. This avoids the need to generate new identifications.

The method can also be carried out in such a way that the monitoring node determines whether the service information relates to one and the same communication service in that the monitoring node checks whether the service information which is transmitted by the at least two service nodes relates to one and the same communication terminal, and only if the service information relates to one and the same communication terminal does the monitoring node check whether the service information contains matching charging identifications. This variant is distinguished by particularly little computation and processing complexity in the monitoring node, since the monitoring node normally in any case reads the information contained in the service information relating to the communication terminal (that is to say for example the IP address of the communication terminal). Comparison of this information makes it possible to check in a simple manner whether the service information relates to one and the same communication terminal. The node does not need to check the charging identifications for a match unless this is the case.

The method can also advantageously be carried out by the monitoring node determining whether the service information relates to one and the same communication service in that the monitoring node checks whether the service information which is transmitted by the at least two service nodes contains matching identifications (signaling information identifications) which characterize the interchange of the signaling information. Examples of identifications such as these which characterize the interchange of the signaling information are, for example, the "call identifier", "local tag" and "remote tag" which occur in SIP dialogs (SIP=Session Initiation Protocol). These identifications can be used to reliably and uniquely determine whether the service information relates to one and the same communication service.

The method can also be carried out in such a way that the monitoring node determines whether the service information relates to one and the same communication service in that the monitoring node checks whether the service information which is transmitted by the at least two service nodes contains matching control information for a gateway which passes on the communication service payload data. Control information such as this describes the payload data streams (for example IP streams) which are associated with the communication service and is occasionally also referred to as "filter information for the gateway".

One example of filter information such as this is a so-called "IP-5 tuple", comprising the IP address and the port number of the destination of IP packets, the IP address and the port number of the sender of IP packets, and a protocol identifier of the protocol which is being transported within the Internet Protocol. If the control information items contained in different service information items match, then the monitoring node then decides that the service information relates to one and the same communication service. This solution is of particular interest for the roaming situation, when no charging for the transmission of the payload data takes place in the visited network. In this case, the payload data is transmitted at no cost (free of charge) in the visited network and, in consequence, the home network does not send any detailed service-specific information (that is to say for example no charging identification) to the monitoring node in the visited network. In this situation, only the control information for the gateway (and possibly additionally information relating to the required quality of service) exists in the visited network. In this roaming situation as well, the control information can be used to decide without any doubt whether the service information does or does not relate to one and the same communication service.

The method according to the invention can be carried out in such a way that the service node which is selected is that which has the highest priority of all those service nodes whose service information relates to one and the same communication service. Priority control such as this makes it possible to very quickly and easily select that service node whose service information is to be used.

According to the invention, the method can be carried out in such a way that the service nodes are each assigned a priority, and the service nodes transmit priority information about the priority assigned to them to the monitoring node, in response to which the monitoring node selects the service node with the highest priority. In this case, during their configuration, the service nodes are each assigned a priority, for example a priority value is stored in each service node. In this case, the monitoring node does not need to know the priority of all the service nodes, and just needs to receive the priority information relating to the individual service nodes.

However, the method can also advantageously be carried out in such a way that the service nodes are each assigned a priority, priority information relating to the priority assigned to the service nodes is stored in the monitoring node, and the monitoring node selects the service node with the highest priority. This advantageously makes it possible to keep the configuration complexity in the service nodes low, because there is no need to store priority information in each service node. The priorities are advantageously managed for all the service nodes at a single point, specifically in the monitoring node.

In this case, the method can be carried out in such a way that a service node which provides a "call session control function" is assigned a lower priority than the other service node. This assignment of a lower priority advantageously takes account of the fact that a service node which provides a "call session control function" often has only inaccurate or incomplete service information. Since the other service nodes are assigned a higher priority than the service node which is providing the "call session control function", this advantageously means that, when a differently configured service node is present, the service information of the other service node is used. This results in the capability for more precise and more accurate control of the quality of service and/or service fees.

The method can also be carried out in such a way that one and the same service node is assigned different priorities for different communication services. This allows service-specific definition of the priorities in a preferred manner. This preferably makes it possible for the service information of a first service node to be used for a first communication service (if the first service node has a higher priority than a second service node) while the service information of the second service node is used for a second communication service (if the first service node has a lower priority than the second service node). The communication services can in this case preferably be distinguished with the aid of an identification in the form of a so-called "application function application identifier AVP".

The method can preferably be carried out in such a way that when a new service node is involved in the communication service, with the new service node being assigned a higher priority than the previously involved service node, the monitoring node uses the service information which is transmitted by the new service node. This makes it possible to switch in a preferred manner, even while a communication service is being carried out by a previous service node whose service information has been used, to the new service node whose service information will be used for this communication service in the future. This advantageously allows dynamic switching or transfer from one service node to a new service node with a higher priority if a new service node such as this is included in the communication service, in addition to the previously used service nodes, during the communication service. By way of example, a new service node such as this may be an announcement server which is used only for a brief announcement in a communication service and which is therefore involved in the communication service for only a short time period.

The method according to the invention can preferably be carried out in such a way that the signaling connections, which are intended for transmission of the service information, between the monitoring node and the service nodes which have not been selected are maintained during the method process, and the service nodes which have not been selected are informed via the signaling connections about events which occur while carrying out the service. However, in this case, only the signaling connection between the monitoring node and the selected service node is used for transmission of the service information to the monitoring node. The other service nodes can advantageously be informed about events occurring in the communication network (for example about functions or malfunctions of the gateway or of a partial communication network) via the signaling connections between the monitoring node and the service node which has not been selected.

The method can be carried out in such a manner that signaling connections between the monitoring node and at least two service nodes are maintained during the method process. This ensures that a signaling connection always exists between the monitoring node and at least one service node—even in the event of an unplanned failure of a service node or in the event of a service node being only temporarily involved in the communication service—such that the monitoring node can receive service information of at least one service node at any time.

The method can also be carried out in such a way that the monitoring node informs those service nodes which have not been selected that the service information of another service node is being used, in response to which those service nodes which have not been selected can clear their signaling connection to the monitoring node. This advantageously keeps the amount of signaling traffic between the monitoring nodes and the service nodes low, thus also leading to cost savings.

According to the invention, however, the method can alternatively be carried out in such a way that the monitoring node informs those service nodes which have not been selected that the service information of another service node is being used, and the monitoring node clears the signaling connections to those service nodes which have not been selected. In this case, an appropriate error message can be used to provide the information to the service nodes which have not been selected. Clearing of the signaling connection between a monitoring node and a service node can also be initiated by clearing or loss of the transport connection. In this case, it is worthwhile for the service node to end the service. If, in contrast, the signaling connection to a first service node is cleared because the monitoring node has selected a different service node, the first service node should not end the service. A service node can distinguish between these two situations on the basis of the specific error message and can appropriately decide whether it will clear the service. This advantageously on the one hand minimizes the signaling traffic (cost saving); on the other hand, the specific error message avoids those service nodes which have not been selected ending the execution of the service in an uncontrolled or uncoordinated form.

The method can preferably be carried out in such a way that, if a service node is only temporarily involved in the communication service, the service node signals this to the monitoring node.

The method can then also preferably be carried out in such a way that, if a service node is only temporarily involved in the communication service, at least one signaling connection is maintained between the monitoring node and a second service node in order that the monitoring node can use the service information originating from the second service node after the end of the involvement of the service node. In this case, the second signaling connection between the monitoring node and the second service node is advantageously maintained only when a service node which is involved only temporarily in the communication service is actually present. On the one hand, this avoids the monitoring node losing the connection to all the service nodes, while on the other hand, however, this allows the monitoring node to clear excess signaling connections and thus to reduce the signaling traffic.

In the method, the monitoring node can advantageously be a communication network node which provides a policy decision function, a communication network node which provides a service policy decision function, a communication network node which provides a charging rules function, or a communication network node which provides a policy control and charging rules function.

In the method, the service node can preferably be a communication network node which provides a call session control function or a server which provides the communication service.

A monitoring node in the form of a communication network node which provides a policy decision function (PDF) is used, for example, to control the quality of service (QoS). For the purposes of the 3rd Generation Partnership Project 3GPP, a so-called "service based local policy (SBLP)" is provided (Standards TS23.207, TS29.207 and TS29.208) for service-dependent authorization of the setting up of IP payload connections via the packet-oriented GPRS mobile radio network (GPRS=General Packet Radio Service). A GPRS payload connection is in this case also referred to as a PDP context (Packet Data Protocol context). Setting up and modification of PDP contexts initiated by a mobile communication terminal (user equipment UE) is authorized at the so-called GGSN (Gateway GPRS Support Node) via a so-called Go interface by the "policy decision function" (PDF), in which case the "policy decision function" knows those services which are being used by the communication terminal UE at that time. The "policy decision function" PDF is informed by a service node (which is carrying out a so-called "application function" (AF)) about these services via a so-called Gq interface.

The service node interchanges signaling information with the communication terminal in order to negotiate the service. This interchange takes place, for example, by means of the "session initiation protocol" (SIP) which, for example, is used in the so-called "Internet Protocol Based Multimedia Subsystem" (IMS). This signaling is also referred to as "service signaling". The signaling information which is interchanged between the communication terminal and the service node relating to the execution of a service (for example a so-called SIP dialog in accordance with RFC 3261) is also referred to as a "service signaling instance". The node uses a so-called "authorization" (in this case the policy decision function PDF) to define the "quality of service" permitted for the PDP context, that is to say the bandwidth for the transmission of payload data (for example in kbit/s) and, by means of so-called QoS classes, the permitted data packet delay, as well.

A monitoring node in the form of a communication network node which provides a charging rules function is used, for example, for so-called "flow based charging" (FBC). FBC is a service charging mechanism which is described, for example, in the Standards TS23.125, TS29.210 and 29.211 for the purposes of the 3rd Generation Partnership Project. In the case of "flow based charging", so-called "charging rules" are installed at the gateway GPRS support node (GGSN), via a Gx interface, for specific PDP contexts of a "charging rules function" (CRF). The "charging rules" describe IP data streams and the charging rules to be used for these IP data streams. The "charging rules function" selects the charging rules taking account of the services currently being used by the communication terminal, with the charging rules function being informed of these services by a service node via the Rx interface.

For the purposes of the 3rd Generation Partnership Project, Release 7, the Standard TS23.203 provides for the fusion of the "service based local policy" SBLP and the "flow based charging functionalities"; in this case, the "policy decision function" PDF and the "charging rules function" CRF are combined to form the so-called "policy and charging rules function" PCRF. This combined functionality is also referred to as "policy and charging control" PCC.

Both in the case of the "service based local policy" SBLP (that is to say for controlling the quality of service) and in the case of "flow based charging" FBC (that is to say for controlling the service fees), and for the combination of control of the quality of service and the service fees (policy and charging control PCC), a single monitoring node (that is to say the node which provides the "policy decision function", the node which provides the "charging rules function" CRF or the node which provides the "policy and charging rules function" PCRF) is thus supplied from one or more service nodes with information relating to the services used. In this case, the service nodes provide the application functions AF. In this case, the service node/the application function AF sets up the signaling connection to that monitoring node which is responsible for the mobile communication terminal that is involved. The task of the application function AF/of the service node is therefore to make contact with the monitoring node which is responsible for the mobile communication terminal which is identified, for example, by its IP address.

For certain telecommunication services, a plurality of service nodes may be involved in service provision for the same service signaling instance (for example for an IMS dialog between a communication terminal and a video server). This situation can occur, in particular, when using the IP multimedia subsystem IMS, in which case the IMS is then used to support the communication service (for example in order to select a suitable server); the server provides the actual service. The service node which is included in the service signaling (IMS node, for example the call session control function CSCF) then interchanges information with the monitoring node. A server which is providing the telecommunication service (application server) may, however, also itself interact with the monitoring node and interchange messages. For example, in the case of an IMS-switched video communication service (which runs on a specific video server, provided by this video server), both the service node (CSCF) of the IMS and the video server can interact as service nodes with the monitoring node, and interchange message. For this purpose, the call session control function CSCF uses the information which is available in the service signaling; the video server can, furthermore, also access specific service-specific information (for example the type of video, length of the video, etc.) and can send service information based on this service-specific information to the monitoring node.

The described method is also applicable to a roaming situation. For a roaming situation, two instances of the "policy and charging rules function" PCRF are discussed within the 3GPP release 7: a PCRF provided in the home network and a PCRF provided in the visited network. The PCRF in the visited network receives all the required information from the service signaling from the proxy call session control function P-CSCF. However (in particular for flow based charging), certain information which is available only in the home network is required. The serving call session control function S-CSCF and the application server in the home network therefore interact with the PCRF (monitoring node) in the home network. This monitoring node then passes on the relevant information to the PCRF in the visited network. Different service information can thus also be passed to the PCRF of the visited network, if required, for the same communication service, in the event of roaming. The interaction of one monitoring node with a plurality of service nodes is described in the course of this application. However, the described method can also be used for the roaming situation described above. If the monitoring node in the home network is considered as a specific service node and behaves like a service node, then the described method also makes it possible for a monitoring node in the visited network to receive service information relating to the same communication service from a service node in the visited network and from another monitoring node in the home network. The node in the home network then simply represents another service node.

The "Telecoms & Internet converged Services & Protocols for Advanced Networks" (TISPAN) as standardized by the European Telecommunications Standards Institute (ETSI) describes a so-called "next generation network" NGN, which likewise uses the IMS. In this case, a so-called "service policy decision function" SPDF is used as a monitoring node. The SPDF is used both to control the so-called "core resource and admission control function" (Core-RACF), which is used for the gateway to the core network of another operator, and to control the so-called "access resource and admission control function" (Access-RACF) which is used for the gateway to the access network, cf. the ETSI Standard TS 185.001. In this case, the intention is for the SPDF at the gateway to the core network of another operator to be identical to the SPDF at the gateway to the access network, and for central monitoring of the quality of service to be carried out. According to TISPAN, Release 1, ETSI TS 183.021, at the boundary to a core communication network of another network operator, the SPDF is supplied with information from the so-called "IMS border control function"(IBCF, service node) via the so-called Gq interface. According to ETSI ES 282.003, at the boundary to an access network, the SPDF is likewise supplied with information from a service node (AF), preferably a proxy call session control function (P-CSCF) via the so-called Gq interface. Thus, in this case, a problem also arises in that a single SPDF (monitoring node) receives service information from two separate application functions AF (service nodes), in which case, by way of example, one service node may be in the form of an IBCF, and the other service node a P-CSCF. The described method can also be used in this situation, in particular for selection of the service information to be used for monitoring the quality of service. However, the SPDF does not just monitor the quality of service but can also monitor a so-called "network address translator" (NAT) for the payload connections which correspond to the negotiated services. A separate monitored NAT may in each case be located at the gateway to the access network and at the gateway to the core network of another operator. The SPDF passes on specific information relating to NAT monitoring between the AF and the NAT, in particular modified IP addresses and port numbers. In this case, the SPDF has to interchange different information relating to NAT monitoring with P-CSCF and IBCF. For this reason, it is particularly advantageous in this case to use the embodiment in which the signaling connections which are provided for transmission of the service information between the monitoring node and the service nodes which are not selected for monitoring of the quality of service are maintained during the method process, in which case, in addition, specific information relating to NAT monitoring is preferably also interchanged. When using an NAT, care must be taken during evaluation of the service information in the monitoring node to ensure that the association with a communication service is not determined on the basis of the filter information, since the service nodes upstream and downstream of the NAT transmit different IP addresses and possibly also port numbers for the same communication service to the monitoring node.

The problems solved by the described method may, for example, comprise different service nodes transmitting different descriptions of the quality of service to be authorized and/or of the charging rules to be used as service information to the monitoring node. In general, the monitoring node can then not decide which of the contradictory information items should be used. However, malfunctions can also occur when the service nodes supply the same service information with the monitoring node assuming, incorrectly however, that the different service information relates to different service signaling instances (that is to say different communication services). For example, a monitoring node could thus authorize a bandwidth which is twice as wide as that required if it were to receive the same service information relating to the quality of service from two service nodes. This problem can also be solved by the described method.

BRIEF DESCRIPTION OF THE SEVERAL VIEWS OF THE DRAWING OF THE DRAWING

The invention will be explained in more detail in the following text with reference to exemplary embodiments. In this context.

DESCRIPTION OF THE INVENTION

Figure 1:
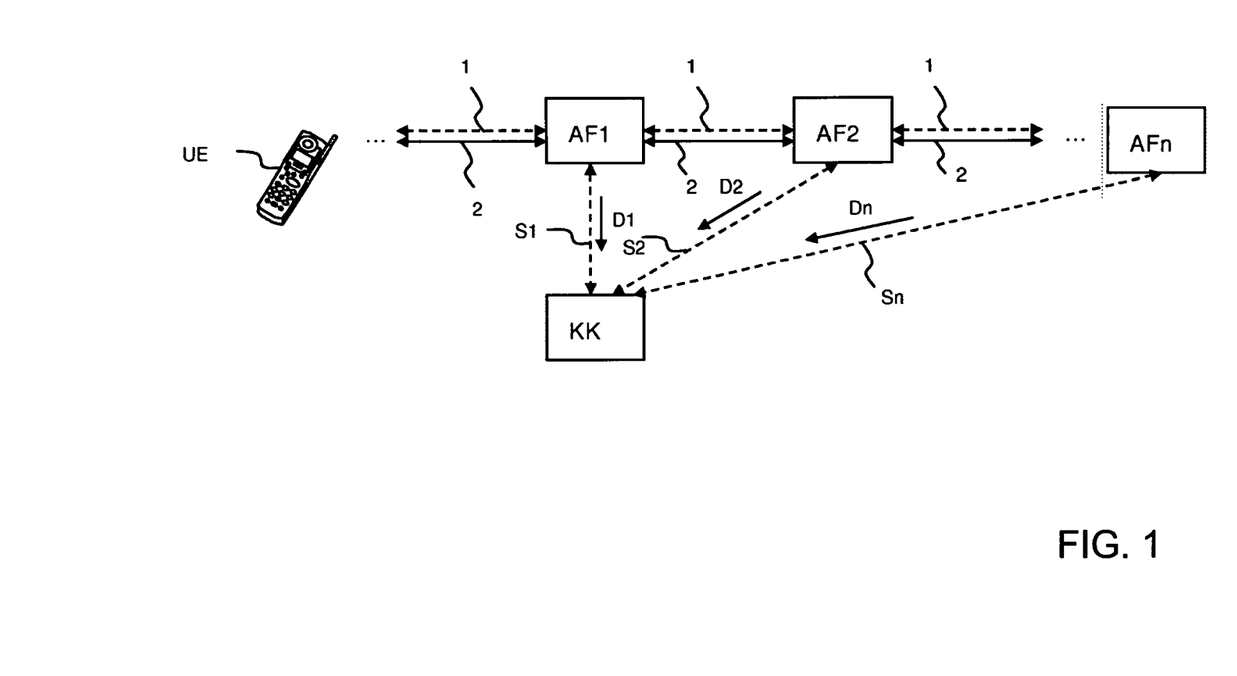
FIG. 1 shows a first exemplary embodiment of the method according to the invention.

FIG. 1 shows a communication terminal UE (user equipment) in the form of a mobile telephone, a first service node AF1, a second service node AF2, an n-th service node AFn and a monitoring node KK. While preparing for and/or carrying out a communication service, signaling information 1 is interchanged between the communication terminal UE and the first service node AF1 involved in the communication service, the second service node AF2 involved in the communication service and, possibly, further service nodes AF3 to AFn involved in the communication service. By way of example, the service node AFn is a service server (a service-providing computer, for example a video server) which provides the communication service for the communication terminal UE. When carrying out the service, the server AFn transmits payload data via the second service node AF2 and the first service node AF1 to the communication terminal UE. This payload data transmission is illustrated by a solid line, and is identified by the reference symbol 2. The payload data does not necessarily need to be transmitted via all the service nodes, for example with FIG. 2 showing a variant in which the payload data is not transmitted via the first service node AF1.

The first service node AF1, the second service node AF2 and the server AFn send service information D1, D2 and Dn to the monitoring node KK. This service information D1, D2 and Dn is transmitted via signaling connections S1, S2 and Sn to the monitoring node, and represents signaling information. As described in detail below, the monitoring node KK then selects one service node from the service nodes AF1, AF2 to AFn (the selected service node). In the exemplary embodiment, the service node AFn is the selected service node. In the exemplary embodiment, the monitoring node KK therefore uses only the service information for the selected service node AFn (that is to say the service information of the server) in order to control a gateway, which is not illustrated in FIG. 1, such that this provides the quality of service, as required for the communication service, for the transmission of the payload data, and implements the charging for the service, in particular charging for the transmission of the payload data. In this case, the gateway is used for payload data transmission 2.

Figure 2:
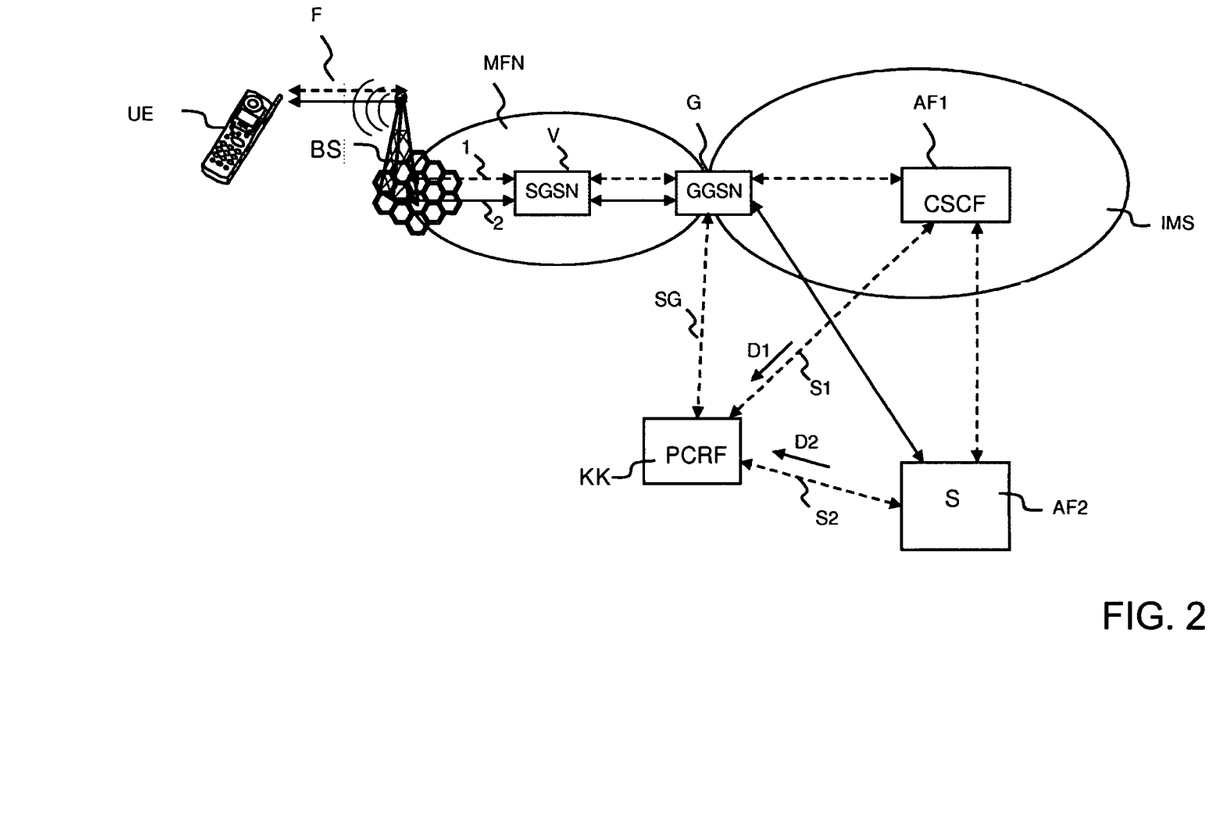
FIG. 2 shows a second exemplary embodiment of the method according to the invention.

FIG. 2 shows a further exemplary embodiment of the method according to the invention. A communication terminal UE is connected via a radio interface F to a base station BS in a cellular mobile radio network MFN. The cellular mobile radio network contains a switching center V in the form of a serving GPRS support node (SGSN). The switching center V is connected via a gateway G (network intermediate node, network gateway node, network connecting node; in this case in the form of a gateway GPRS support node (GGSN)) to an "IP multimedia subsystem" IMS. The IP multimedia subsystem IMS has a first service node AF1 in the form of a network node which provides a "call session control function" (CSCF). This first service node AF1 is connected to a service server S, which in the exemplary embodiment is in the form of a video server S. The service server S represents a second service node AF2. The first service node AF1 is connected via a first signaling connection S1 to a monitoring node KK, and the second service node AF2 is connected via a second signaling connection S2 to the monitoring node KK. In the exemplary embodiment, the monitoring node carries out a "policy and charging rules function" (PCRF). The node KK is connected via a further signaling connection SG to the gateway G and controls the gateway G, inter alia, with respect to the quality of service of the transmission of communication service payload data and with respect to charging for the transmission of communication service payload data (service charging). As in FIG. 1, the transmission of signaling information is represented by dashed lines 1; the payload data transmission is represented by solid lines 2.

A user of the communication terminal UE decides to use a telecommunication service which is offered by the second service node AF2, which in the exemplary embodiment represents a video server S. The user uses his communication terminal UE to request transmission of a video film from the server S to the communication terminal UE. Signaling information is then interchanged between the communication terminal UE, the switching center V, the gateway G, the first service node AF1 and the second service node AF2. FIG. 2 shows the transmission of signaling information by means of dashed lines, while the transmission of payload data is illustrated by means of solid lines.

The first service node is designed to transmit service information D1 relating to this communication service (video service) to the monitoring node KK. The second service node AF2 is likewise designed to transmit service information D2 relating to the video service to the monitoring node KK. The monitoring node is itself designed to receive the service information D1 relating to the video service from the first service node AF1 and to receive the service information D2 relating to the video service from the second service node AF2. The second service node AF2 transmits the service information D2 via the signaling connection S2 to the monitoring node KK, with this service information D2 comprising:

the IP address and the port number of the second service node AF2,
the IP address and the port number of the communication terminal UE,
information about the nature of the service ("video service"),
information about the required quality of service, for example the bandwidth assured for data transmission for the video service is 2000 kbit/s, and
a charging identification (a so-called "AF charging identifier").

This service information D2 is sent via the second signaling connection S2 to the monitoring node KK, and is received by the latter.

The first service node AF1 transmits service information D1 via the first signaling connection S1 to the monitoring node KK. However, in the exemplary embodiment, this signaling information comprises only the IP addresses and the port numbers of the respective communication terminal UE and the second service node AF2, as well as the same charging identification (the so-called "AF charging identifier"), which the service information D2 also contains.

On the basis of the service information D1 and D2 which is transmitted by the service nodes AF1 and AF2, the monitoring node now determines whether the service information D1 transmitted by the first service node AF1 and the service information D2 transmitted by the second service node AF2 relate to the same communication service (in this case the video service). To do this, the monitoring node KK first of all checks whether the service information D1 transmitted by the first service node AF1 and the service information D2 transmitted by the second service node AF2 relate to the same communication terminal. Since both the service information D1 transmitted by the first service node and the service information D2 each contain the IP address and the port number of the communication terminal UE, the monitoring node KK recognizes that both the service information D1 and the service information D2 relate to the same communication terminal UE. The node KK then checks whether the service information D1 and the service information D2 contain matching charging identifications. Since the service information items D1 and D2 contain matching charging identifications, the monitoring node KK decides that the service information relates to one and the same communication service for the communication terminal UE.

In one alternative embodiment, in order to determine whether the service information items D1 and D2 relate to one and the same communication service, the monitoring node KK can also merely check whether the service information items D1 and D2 contain the same charging identification. There is then no need to check whether the service information D1 transmitted by the first service node AF1 and the service information D2 transmitted by the second service node AF2 relate to the same communication terminal.

In a further alternative embodiment, in order to determine whether the service information items D1 and D2 relate to one and the same communication service, the monitoring node KK can also determine/check whether the service information items D1 and D2 contain matching signaling information identifications (for example the so-called "call identifier", "local tags" or "remote tags" of the SIP dialog that is used for service signaling).

In a further alternative embodiment, in order to determine whether the service information items D1 and D2 relate to one and the same communication service, the monitoring node KK can also determine/check whether the service information items D1 and D2 contain matching control information for the gateway G.

Once the monitoring node has decided that the service information items D1 and D2 both relate to the communication service "video service", the monitoring node selects one of the two service nodes AF1 and AF2, and only the service information originating from the selected service node is used in order to control the quality of service and/or the service fees at the gateway GGSN. The selection process is carried out as described in the following text.

In the exemplary embodiment, the first service node AF1 is assigned the lowest available priority "priority 1". This is because, in the exemplary embodiment, service nodes which are carrying out a call session control function CSCF are always assigned the lowest priority. The second service node AF2 is assigned the higher priority "priority 3". Information relating to the assigned priority (priority information) is transmitted by the service node AF1 and the service node AF2 in the service information D1 and in the service information D2, respectively, to the monitoring node KK.

The node then selects that service node which has the highest priority, that is to say in the exemplary embodiment the second service node AF2. The second service node AF2 is then the selected service node.

In another exemplary embodiment, information relating to the priority respectively assigned to the service nodes AF1 and AF2 can also simply be stored in the monitoring node KK, but not in the service nodes AF1 and AF2 themselves. The node KK then uses the service information D1 to recognize that this originates from the first service node AF1 (for example on the basis of sender information transmitted with the service information D1). The node KK likewise recognizes that the second service information D1 originates from the second service node AF2. Since the higher priority is stored for the second service node, the monitoring node uses only the second service information D2 for controlling the quality of service and/or the service fees.

If a new service node is temporarily involved in the "video service" communication service (for example a service node, which is not illustrated in FIG. 2, in order to produce an announcement which is intended for the user of the communication terminal UE), then, for example, this new service node can be assigned the priority "priority 4". If this new service node were then to send service information to the monitoring node KK, then the monitoring node KK would use the higher priority of the new service node as the basis for using the service information originating from this new service node, rather than the service information D2, as previously.

If the communication terminal UE requests a different communication service, which is likewise provided by the second service node AF2, then, in conjunction with this other communication service, the second service node AF2 can be assigned a different priority, for example the priority "priority 2".

Although, in the exemplary embodiment, the monitoring node KK uses only the service information D2, the signaling connection S1 to the first service node AF1 is nevertheless maintained. The first service node AF1 can be informed, for example about suddenly occurring events, via the signaling connection S1, for example relating to a disturbance at the gateway G.

However, the method can also be carried out in such a way that the monitoring node KK informs the first service node AF1 that the monitoring node KK is using exclusively the service information D2 of the second service node AF2 and that the service node AF1 then clears the signaling connection S1. Alternatively, the monitoring node KK can also inform the first service node AF1 that it is using the service information D2 of the second service node AF2, then itself clearing the signaling connection S1 to the first service node AF1. However, it is also possible for signaling connections between the monitoring node and at least two service nodes to be maintained all the time throughout the entire method process, that is to say in this case one signaling connection in each case between the monitoring node KK and the first service node AF1, and between the monitoring node KK and the second service node AF2.

The method can also be carried out in such a way that, in the case of the announcement service node as mentioned above being only temporarily involved in the communication service, in addition to the signaling connection between the announcement service node and the monitoring node KK, at least one second signaling connection is also maintained between the monitoring node and, for example, the second service node AF2. As soon as the announcement service node is no longer involved in the communication service, it is then possible to immediately use the service information D2 originating from the second service node AF2, again, without any time delay.

One particular advantage of the described method is that, in the case of telecommunication services in which a plurality of service nodes are involved, there is no need to match the configurations of the individual service nodes to one another. Each service node can be configured (separately and independently of the configuration of other service nodes) for example on the basis of whether it sets up a signaling connection to the monitoring node (for example: always set up signaling connection or set up signaling connection only for specific services) and whether or which service information/service data it transmits to the monitoring node. This is particularly advantageous when the service nodes are associated with different network operators, for example as is often the case during roaming or when using so-called "third party application functions". In these situations, there is advantageously no need for any discussion between the various operators, and there is no need to configure the various service nodes for more than one operator and network.

In the case of the method according to the invention, it is advantageously possible to freely choose (for example by the assignment of priorities) which service node one wishes to use for a specific communication service, in order to use its service information. Furthermore, service-specific criteria (for example the nature and price of a video) can preferably be used as a selection criterion for interchanging information between a service node and monitoring node. For example, a service node may be configured in the form of a service server such that it transmits service information to the monitoring node only for specific videos and, by means of this service information, initiates a specific type of service fee, or requests a specific quality of service, only for specific videos. In this situation, the service server can also transmit information which is known only to the service server (for example the nature of the video) with the service information. However, if service-specific information such as this is not relevant for the quality of service and/or service fees, then another service node (for example the "Call Session Control Function") can advantageously transmit the service information to the monitoring node on the basis of less extensive information. In this situation, for example, the service server advantageously does not require any signaling connection to the monitoring node, which means that no corresponding interface is required at the service server.

The described method is advantageously a very flexible method which on the one hand makes it possible to use the service information of the service node which is most suitable for a specific service, and which on the other hand avoids the service information of a plurality of service nodes being used for one and the same communication service, thus avoiding the problems and difficulties described initially. There is advantageously also no need to match the signaling information which is interchanged between the communication terminal and the service nodes to the method, and in particular this signaling information does not need to have service-specific parameters added to it. In particular, there is no need for this interchanged signaling information to contain information relating to which service node should transmit the service information to the monitoring node. There is likewise no need to store service-specific data (in the exemplary embodiment, for example data relating to the nature of the video) outside the service server.

ABBREVIATIONS

AF "Application Function" (the function running in the service node)
AVP "Address Value Pair"
CRF "Charging Rules Function"
CSCF "Call Session Control Function"
FBC "Flow Based Charging"
GGSN "Gateway GPRS Support Node"
GPRS "General Packet Radio Service"
IBCF "IMS Boarder Control Function"
IMS "Internet Protocol based Multimedia Subsystem"
IP "Internet Protocol"
NGN "Next Generation Network"
PCC "Policy and Charging Control"
PCRF "Policy and Charging Rules Function"
P-CSCF "Proxy Call Session Control Function"
PDF "Policy Decision Function"
PDP context "Packet Data Protocol" context
QoS "Quality of Service"
RACF "Core Resource and Admission Control Function"
SBLP "Service Based Local Policy"
S-CSCF "Serving Call Session Control Function"
SGSN "Serving GPRS Support Node"
SIP "Session Initiation Protocol"
SPDF "Service Policy Decision Function"
UE "User Equipment"

The invention claimed is:

1. A method for enabling control of a quality of service and/or of a service fees for telecommunication services involving a plurality of service nodes, the method which comprises:
    while initiating and/or carrying out a communication service to convey payload data to a communication terminal, interchanging signaling information between a communication terminal and at least two service nodes involved with the communication service;
    wherein the service nodes are configured to transmit service information, which is relevant to the communication service, to a control node; and
    receiving, with the control node, the service information relating to the communication service from the at least two service nodes;
    determining, with the control node, whether the service information transmitted by the at least two service nodes relates to one and the same communication service; and
    if the service information relates to one and the same communication service, selecting with the control node service information from the transmitted service information, and using the selected service information to control at least one of the quality of service and the service fees, wherein signaling information provided by the communication terminal for initiating the communication service is conveyed between the at least two service nodes.

2. The method according to claim 1, which comprises, if the service information relates to one and the same communication service, selecting with the control node one service node of the at least two service nodes and using only that service information which originates from the selected service node to control the quality of service and/or the service fees.

3. The method according to claim 1, wherein the determining step comprises checking with the control node whether the service information received from the at least two service nodes contains matching charging identifications.

4. The method according to claim 1, wherein the determining step comprises:
    checking with the control node whether the service information received from the at least two service nodes relates to one and the same communication terminal; and
    if, and only if, the service information relates to one and the same communication terminal, checking with the control node whether the service information contains matching charging identifications.

5. The method according to claim 1, wherein the determining step comprises checking with the control node whether the service information received from the at least two service nodes contains matching identifications characterizing an interchange of the signaling information.

6. The method according to claim 5, wherein the identifications characterizing an interchange of signaling information are selected from the group consisting of a "call identifier," "local tags," and "remote tags".

7. The method according to claim 1, wherein the determining step comprises checking with the control node whether the service information received from the at least two service nodes contains matching control information for a gateway passing on communication service payload data.

8. The method according to claim 1, wherein the control information is comprised of IP-5 tuples.

9. The method according to claim 1, which comprises selecting a service node with the highest priority of all those service nodes whose service information relates to one and the same communication service.

10. The method according to claim 9, which comprises:
    assigning a priority to each of the service nodes; and
    transmitting from the service nodes priority information about the priority assigned thereto to the control node and, in response, selecting with the control node, the service node with the highest priority.

11. The method according to claim 9, which comprises:
    assigning a priority to each of the service nodes; and
    storing in the control node priority information relating to the priorities assigned to the service nodes; and
    selecting with the control node the service node with the highest priority.

12. The method according to claim 9, which comprises assigning a service node that provides a call session control function a lower priority than another service node.

13. The method according to claim 9, which comprises assigning to one and the same service node different priorities for different communication services.

14. The method according to claim 9, wherein, when a new service node is involved in the communication service and the new service node is assigned a higher priority than the previously involved service node, the control node uses the service information received from the new service node.

15. The method according to claim 1, which comprises:
    maintaining the signaling connections, intended for transmission of the service information, between the control node and the service nodes that have not been selected; and
    informing the service nodes that have not been selected via the signaling connections about events occurring while the service is carried out.

16. The method according to claim 1, wherein the control node informs those service nodes that have not been selected that the service information of another service node is being used, whereupon the service nodes that have not been selected are allowed to clear a signaling connection to the control node.

17. The method according to claim 1, which comprises, with the control node:
informing those service nodes that have not been selected that the service information of another service node is being used; and
clearing the signaling connections to those service nodes that have not been selected.

18. The method according to claim 1, which comprises, during the method process, maintaining signaling connections between the control node and at least two service nodes.

19. The method according to claim 1, which comprises, if a given service node is only temporarily involved in the communication service, maintaining at least one signaling connection between the and a second service node in order that the control node can use the service information originating from the second service node after an involvement of the given service node is terminated.

20. The method according to claim 19, which comprises signaling, from the given service node that is involved only temporarily in the communication service, to the control node that that given service node will be involved in the communication service only temporarily.

21. The method according to claim 1, wherein the control node is a communication network node which provides a policy decision function, a communication network node which provides a service policy decision function, a communication network node which provides a charging rules function, or a communication network node which provides a policy control and charging rules function.

22. The method according to claim 1, wherein the service node is a communication network node providing a call session control function or a server providing the communication service.

23. The method according to claim 1, wherein one of the service nodes is a control node in a home network, which transmits service information to the control node in a visited network.

24. A control node, comprising:
a receiver for receiving from at least two service nodes service information relating to a communication service to convey payload data to a communication terminal;
a determining processor for determining whether the service information transmitted by the at least two service nodes relates to one and the same communication service; and
a selecting processor for selecting service information from the transmitted service information, if the service information relates to the same communication service in order to use the service information to control at least one of a quality of service and service fees of the communication service, wherein signaling information provided by the communication terminal for initiating the communication service is conveyed between the at least two service nodes.

25. The control node according to claim 24, wherein, if the service information relates to the same communication service, the control node is configured to select one service node of the at least two service nodes and to use only that service information which originates from the selected service node to control the quality of service and/or the service fees.

26. The control node according to claim 24, wherein said determining processor for determining whether the service information relates to the same communication service is configured to check whether the service information transmitted by the at least two service nodes contains matching charging identifications.

27. The control node according to claim 24, wherein said determining processor for determining whether the service information relates to the same communication service is configured to check whether the service information transmitted by the at least two service nodes relates to the same communication terminal, and if the service information relates to the same communication terminal the control node is configured to check whether the service information contains matching charging identifications.

28. The control node according to claim 24, wherein said determining processor for determining whether the service information relates to the same communication service is configured to check whether the service information transmitted by the at least two service nodes contains matching identifications characterizing an interchange of the signaling information.

29. The control node according to claim 28, wherein the control information is comprised of IP-5 tuples.

30. The control node according to claim 24, wherein the identifications characterizing the interchange of signaling information are selected from the group consisting of a "call identifier," "local tags," and "remote tags".

31. The control node according to claim 24, wherein said determining processor for determining whether the service information relates to the same communication service is configured to check whether the service information transmitted by the at least two service nodes contains matching control information, for a gateway which passes on the communication service payload data.

32. The control node according to claim 24, wherein said selecting processor is configured to select the service node that has a highest priority of those service nodes whose service information relates to the same communication service.

33. The control node according to claim 32, which further comprises a priority information receiver for receiving from the service nodes priority information about a priority assigned to the service nodes, and a priority selecting processor for selecting the service node with the highest priority.

34. The control node according to claim 32, which further comprises a memory for storing priority information relating to priority assigned to the service nodes, and a priority selecting processor for selecting the service node with a relatively highest priority.

35. The control node according to claim 32, wherein a service node configured to provide a call session control function has lower assigned priority than another service node.

36. The control node according to claim 32, wherein a given service node is assigned different priorities for different communication services.

37. The control node according to claim 32, which further comprises a transmitter for maintaining signaling connections, which is intended for transmission of the service information, between the control node and the service nodes that have not been selected, and for informing the service nodes that have not been selected via the signaling connections about events that occur while carrying out the service.

38. The control node according to claim 32, which further comprises a transmitter for informing the service nodes that have not been selected that the service information of another service node is being used.

39. The control node according to claim 32, which further comprises a clearing processor for clearing the signaling connections to the service nodes that have not been selected.

40. The control node according to claim 24, wherein, if a service node is only temporarily involved in the communication service, at least one signaling connection is maintained between the control node and a second service node in order that the control node can use the service information originating from the second service node after an involvement of the service node has been terminated.

41. The control node according to claim 24, wherein the receiver is capable of receiving from a service node information that the service node is involved in the communication service only temporarily.

42. The control node according to claim 24, which further comprises at least one of the following:
- a communication network node for providing a policy decision function;
- a communication network node for providing a service policy decision function;
- a communication network node for providing a charging rules function; and
- a communication network node for providing a policy control and charging rules function.

* * * * *

UNITED STATES PATENT AND TRADEMARK OFFICE
CERTIFICATE OF CORRECTION

| | |
|---|---|
| PATENT NO. | : 9,787,850 B2 |
| APPLICATION NO. | : 12/299696 |
| DATED | : October 10, 2017 |
| INVENTOR(S) | : Thomas Belling et al. |

It is certified that error appears in the above-identified patent and that said Letters Patent is hereby corrected as shown below:

On the Title Page

Item [73] should read:
Nokia Solutions and Networks GmbH & Co. KG, Munich (DE)

Signed and Sealed this
Eighth Day of January, 2019

Andrei Iancu
*Director of the United States Patent and Trademark Office*